Figure 1:
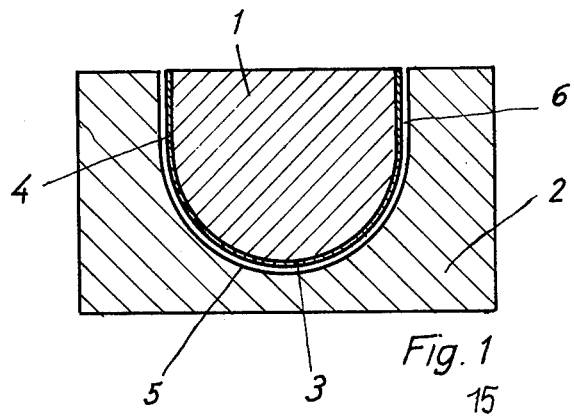

United States Patent [19]
Haas

[11] 3,956,085
[45] May 11, 1976

[54] METHOD FOR THE MANUFACTURE OF A TOOL-SET FOR THE FORMING OF SHEET METAL OBJECTS

[76] Inventor: Eberhard Haas, Beethovenstr. 11, 7104 Obersulm II, Germany

[22] Filed: Dec. 6, 1973

[21] Appl. No.: 422,592

[30] Foreign Application Priority Data
Dec. 6, 1972  Germany............................ 2259719

[52] U.S. Cl.............................. 204/129.35; 204/6; 204/224 M
[51] Int. Cl.².......................... C25F 3/06; C25F 7/00
[58] Field of Search....... 204/129.35, 129.1, 224 M, 204/6

[56] References Cited
UNITED STATES PATENTS

| | | | |
|---|---|---|---|
| 3,095,364 | 6/1963 | Faust et al...................... | 204/224 M |
| 3,513,282 | 5/1970 | Fox....................................... | 219/69 |
| 3,591,760 | 7/1971 | Inoue................................... | 219/69 |
| 3,689,729 | 9/1972 | Neward et al..................... | 219/69 E |
| 3,694,610 | 9/1972 | Saito et al. ........................ | 219/69 M |
| 3,714,017 | 1/1973 | Stark et al. ....................... | 204/284 |
| 3,723,695 | 3/1973 | Gutnajar ........................... | 219/69 E |

FOREIGN PATENTS OR APPLICATIONS

| | | | |
|---|---|---|---|
| 988,545 | 4/1965 | United Kingdom.............. | 204/129.1 |
| 1,803,763 | 5/1970 | Germany........................ | 204/129.1 |

OTHER PUBLICATIONS

Practice and Theory of Electrochemical Machining by Wilson, pp. 77 and 78, pub. by Wiley–Interscience, New York, 1971.

Electrochemical Machining by DeBarr et al., p. 26, pub. by American Elsevier, New York, 1968.

*Primary Examiner*—F. C. Edmundson

[57] ABSTRACT

In manufacturing a tool-set for sheet-metal forming which consists of a punch part and a die part, one of the parts is given its final shape and is then coated with a layer of an electrically conductive material, such as copper electroplated on it. This coated surface is then used as the electrode in a spark erosion process, which removes material from the second part and brings its shape into conformity with that of the first part.

3 Claims, 4 Drawing Figures

U.S. Patent   May 11, 1976   3,956,085

METHOD FOR THE MANUFACTURE OF A TOOL-SET FOR THE FORMING OF SHEET METAL OBJECTS

The invention relates to a method for the manufacture of a tool-set for sheet metal forming which consists of a punch and an accurately corresponding die, one of these parts, say the punch, being completed before the other parts, e.g. the die, is manufactured by erosion by the aid of a forming-electrode.

The invention relates in particular to a method for the manufacture of a tool-set for sheet metal forming, which consists of a die and a punch, the latter being available in its definitive form. A tool-set suitable or the forming or re-forming of sheet metal must include at least two parts which consist of steel, cast steel, or a similar material. The form of the two parts of the tool corresponds to the shape of the formed sheet metal object, one part being a negative, and the other a positive counterpart of the product. The two parts of the tool do not fully correspond in so far as they are separated one from the other by a gap which corresponds approximately to the thickness of the metal sheet. However, with regard to their form the die must accurately correspond to the punch.

Several methods are known by which to manufacture tool-sets for sheet metal forming, which consist of a die and a punch. It is known, in particular, that the die as well as the punch can be produced by erosion, an electrolytically deposited form-electrode being used for the die, and a second form-electrode for the punch. Attempts have moreover been made with a view to erode steel dies, pre-shaped, for example, pre-copied prior to erosion with steel electrodes However, considerable waste is produced in this case at the steel die. With this method it is not possible to make a steel die which is sufficiently accurate. The attempt failed in the end the method lacked the necessary accuracy.

It is the object of the invention to avoid the shortcomings of known methods and to develop a system as described in the introduction, which makes it possible to manufacture tool-sets consisting of die and punch by a more profitable approach. The new method had to make allowances for the varying thicknesses of the sheets formed by the tool-set. This had to be accomplished by simple means, without special outlay and without making fundamental changes when using the tool-set with relatively thin metal sheets and again with heavier sheets, whereby the form of the products had to be the same.

According to the invention, the tool-part referred to above as the "second part", for example the die, is pre-shaped e.g. in a conventional process such as copy-milling, copy-turning, or the like, and it receives its definitive form during the subsequent process of erosion, the "first" part of the tool-set, e.g. the punch — already coated on the side opposite to the "second" part of the tool-set — being used as a forming electrode, the coating layer serving as the electrode which is subjected to wear.

The arrangement can for example be such that the punch, already in its final form, is copper-plated, and that the pre-shaped die receives its final form in an erosion process with the copper-plated punch. According to the invention, the manufacture of the tool-set starts with a ready formed punch. It is characteristic for the present invention that the die is pre-shaped by copy-milling, copy-turning or a similar process, that the punch in its final form is copper-plated, and that the pre-shaped die receives its final form by erosion with the copper-plated punch. This method is profitable for various reasons. The punch itself can be used as a forming-tool i.e. as the electrode in the erosion process by which the die is formed; it is therefore no longer necessary to make an individual electrolytic electrode. The dimensional accuracy of the system is very high; this is due to the punch retaining its original accuracy, which is also reached with the die. It is an additional advantage that material losses are extremely small at the deposited copper layer, and that the heat dissipation through the steel punch is considerably better compared with other methods. It can be the case that inaccuracies of the punch which are due to its manufacture are transferred during the erosion process to the die, but their direction is such that their effects cancel out, which means that the method automatically eliminates these inaccuracies.

Results are particularly good when the punch is galvanically plated, because in this case the copper layers can be deposited very accurately, which is to say, fluctuations in the thickness of the deposited layer are extremely slight.

It is important to bear in mind that the depth of the copper plating should correspond to the difference between the thickness of the metal sheet which is to be formed and the width of the spark- or erosion gap. This is an easy way to determine the depth of the copper layer which has to be deposited on the punch surface, and it is applicable to any desired metal sheet thickness between wide margins. Whatever the conditions, the method makes it possible to manufacture dies with a very accurate finish without using an external forming-electrode.

Depending on the sheet thickness it may be necessary to remove the copper-plating from the punch surface after the manufacture of the die. However, this is not necessarily required in each case.

The present invention may be also characterized by the use of a finished and copper-plated punch for the finishing by erosion of the die of a tool-set. In any case it is essential that one of the two tool parts be used as forming-electrode for the maufacturing of the other tool part, whereby it is protected by copper-plating against too great a waste or wear during treatment by erosion of the work piece.

Figure 2:
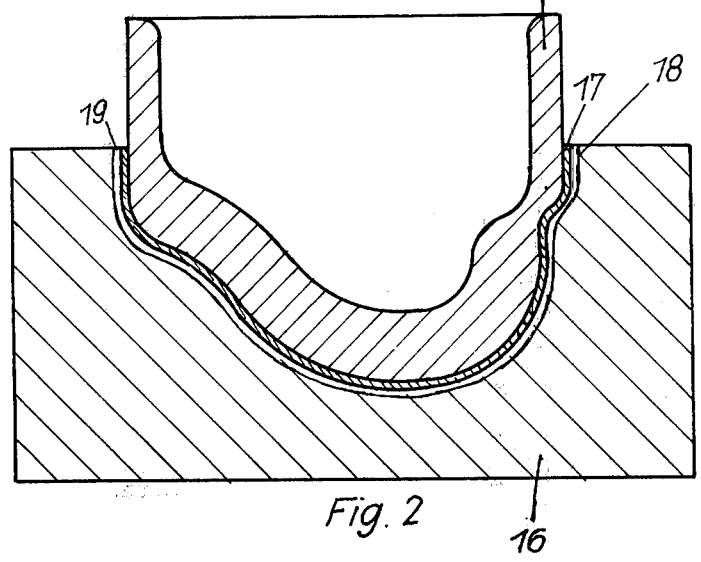
Figures 3, 4:
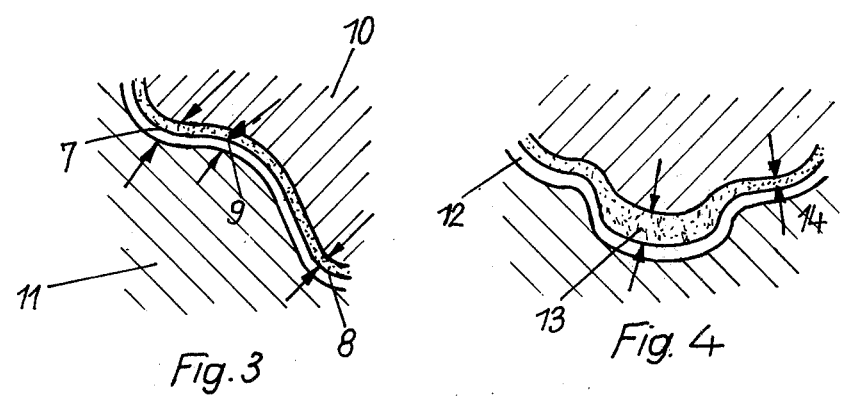

The method according to the invention is described by way of example with reference to the accompanying drawings in which:

FIGS. 1 and 2 are two examples for carrying out the method according to the invention, respectively, in a sectional side view and in a schematical representation, FIG. 3 is a detail referring to the method according to FIG. 1 and FIG. 4 is a detail of a further variant of the method according to the invention in a sectional side view and in schematical representation.

A tool-set for the forming and shaping of sheet material consists — as is shown in FIG. 1 — at least of a punch 1 and a die 2. The punch receives its final form during a suitable production process where its surface 3 is shaped. . It can, for example, be a steel casting. The 3 is the working surface of the punch 1 when the sheet metal objects are formed.

The die 2 is manufactured in two stages; depending on the characteristics of the tool-set, the die is normally pre-shaped by copy-milling or copy-turning or in a similar process. However, any other pre-shaping method can be employed in order to produce the preliminary form of the die.

To give the die 2 its final form, a coating 4, preferably of copper, is deposited on the punch 1, covering its surface 3, that is to say the working surface of the punch 1. The depth to which the copper is deposited is not vitally important. In the example shown in the drawings it was, for example, 0, 3 to 0, 6 mm. The coating, preferably a copper layer, is preferably electrolytically deposited because this makes it possible to produce layers with a particularly dense and even structure. Moreover, the layer thickness can be very accurately controlled. Instead of electro-plating, the punch surface can be provided with a coating suitable as an electrode, which is produced by, say, glueing, soldering, or welding. It is for example feasible to glue thin metal foil on to the punch surface. The applicants prefer nevertheless electro-plating to any other possibility. The punch, provided with its copper coating 4, serves as a forming-electrode during the spark-erosive treatment of the die 2, during which the die surface 5 is made to correspond to the working surface used for sheet-metal forming.

FIG. 1 shows the individual parts during the spark-erosive treatment. The spark-gap 6 between the copper layer 4 and the surface 5 of the die 2 is characteristic for erosive forming.

It is significant that tool-sets manufactured by the described method are suitable for the forming of sheets of metal with varying thicknesses. Obviously the gap between the punch 1 and the die 2 must be reasonably wide when forming thick metal sheets. The tool is adjustable to varying thicknesses '$c$' since the layer thickness '$a$' of the copper coating 4 is fully controllable. The sum of the layer thickness '$a$' of the copper layer 4 plus the width '$b$' of the spark gap 6, corresponds thereby to the thickness '$c$' of the metal sheet. Thus $$a + b = c.$$

It follows that the depth of the layer of metal deposited on the punch surface should correspond to the thickness requirements of the sheet metal. Ideally, the depth of the deposited electro-plating should correspond to the wear depth.

As shown in FIG. 3, the desired sheet thickness 7 that is to say the thickness of the formed metal sheet, corresponds to the sum of the coating-depth 8 plus the width 9 of the spark-gap. 10 is the punch, and 11 is the die.

FIG. 4 shows variations in the sheet thickness or in the gap width which result when certain portions of the copper surface are masked during electro-plating. 12 is the spark-gap, and 13 is the heavy copper coating, while 14 indicates the position of portions of the latter which are comparatively thin. In order to ensure that part of the plating is thin compared with the rest, one has to mask the copper surface where required, so that no further metal can build up and increase the depth of the layer, during electroplating. This intentional non-uniformity of the layer thickness can alternatively be brought about by caustic corrosion. Similarly it is possible to control the width of the spark-gap. In the illustrated example is it between 0,1 and 0,3 mm. Depending on the thickness of the metal sheets which are formed by the tool-set it may be necessary to remove the plating from the punch surface before working. However, this is not necessary unless the copper layer interferes with the sheet thickness. A relatively thin plating need not be removed. Unwanted copper can be electrolytically de-plated without causing any damage to the punch surface. Alternatively, a thin intermediate layer can be applied to the punch surface before it is plated, to make the removal of the copper easier. For example, a thin intermediate layer of zinc under the copper plating will melt when the latter is heated sufficiently. Instead of a metal, the intermediate layer could consist of a chemically soluble material or of a suitable adhesive.

FIG. 2 shows in a further example of the invention the erosive finishing of a die 16 with the corresponding tool punch 15 which consists, for example, of cast iron or cast steel. It is coated with an electrolytically deposited copper layer 17,18 is the die surface, and 19 is the erosion-gap.

What I claim is:

1. A method for the manufacture of a tool-set for sheet-metal forming comprising a punch part and a die part, which comprises preshaping the punch part to its true shape and preshaping the die part approximately to its true shape corresponding to the shape of the punch part, electroplating the shaping surface of the punch part with a layer of electrically conductive material to a depth which corresponds to the difference between the metal sheet which is to formed by the tool and the width of the spark gap which exists during erosion, subjecting the die part to spark erosion utilizing the corresponding punch part as the electrode, and removing the layer of electrically conductive material from the surface of the punch part.

2. A method as claimed in claim 1, in which said layer is of varying thickness.

3. A method of shaping metal of a given thickness which comprises producing a punch part and a die part as defined in claim 1, and pressing the metal between such parts.

* * * * *